United States Patent
Liu et al.

(10) Patent No.: US 7,045,914 B2
(45) Date of Patent: May 16, 2006

(54) SYSTEM AND METHOD FOR AUTOMATICALLY PROVIDING CONTINUOUS POWER SUPPLY VIA STANDBY UNINTERRUPTED POWER SUPPLIES

(75) Inventors: Chia Yuan Liu, Tu-Chen (TW); Hong-Chieh Kao, Tu-chen (TW)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 524 days.

(21) Appl. No.: 10/335,431

(22) Filed: Dec. 30, 2002

(65) Prior Publication Data
US 2004/0070279 A1      Apr. 15, 2004

(30) Foreign Application Priority Data
Oct. 9, 2002     (TW)  ................................ 91123250 A

(51) Int. Cl.
*H02J 9/04*          (2006.01)
(52) U.S. Cl. ........................... 307/64; 307/65; 307/116
(58) Field of Classification Search ................ 307/64, 307/65
See application file for complete search history.

(56) References Cited

U.S. PATENT DOCUMENTS

2002/0069373 A1*   6/2002   Zhuo ........................... 713/324
2004/0160214 A1*   8/2004   Blair et al. ................... 320/118

FOREIGN PATENT DOCUMENTS

JP            408289485 A   *  11/1996

\* cited by examiner

*Primary Examiner*—Brian Sircus
*Assistant Examiner*—Dru Parries
(74) *Attorney, Agent, or Firm*—Wei Te Chung

(57) ABSTRACT

A system for automatically providing continuous power supply via standby uninterrupted power supplies (UPSs) includes: a plurality of primary UPSs (10) for providing power supply to electrically powered devices (3) connecting with the primary UPSs; a plurality of standby UPSs (20) connected to the electrically powered devices for providing power supply when there are malfunctions on the primary UPSs; a switch device (6) connected to the standby UPSs for switching over operational states of the standby UPSs; and a monitoring device (4) connected to the primary UPSs, the standby UPSs, the electrically powered devices and the switch device for collecting information from and giving instructions to the primary UPSs, the standby UPSs and the electrically powered devices. The monitoring device includes a programmable monitoring module (40) for collecting information, a shutdown controlling module (42) for giving shutdown instructions, and a switch controlling module (44) for controlling the switch device.

8 Claims, 3 Drawing Sheets

SYSTEM AND METHOD FOR AUTOMATICALLY PROVIDING CONTINUOUS POWER SUPPLY VIA STANDBY UNINTERRUPTED POWER SUPPLIES

BACKGROUND OF THE INVENTION

1. Field of the Invention

This invention relates to systems and methods for automatically providing continuous power supply via standby uninterrupted power supplies (UPSs), and more particularly to systems and methods that periodically collect information on UPSs and electrically powered devices and automatically invoke standby UPSs for continuous power supply when a shutdown event occurs.

2. Description of Related Art

In recent years, information technology and web technology have advanced rapidly. The convenience of electronic data interchange and data storage has enabled enterprises to transmit and store important information using personal computers, notebooks, servers and like devices. Security and protection of data has become increasingly important. One problem related to data security is power supply for the above-mentioned devices. A sudden voltage sag or an unforeseen power failure can lead to an abnormal shutdown of electrically powered devices, in which unsaved files and programs may be damaged or lost. Most computer equipment requires a stable and uninterrupted power supply whose voltage is kept within a range from −13% to +6% of a standard voltage. If the voltage falls out of this range, the computer equipment cannot operate properly or may even become unusable.

An uninterrupted power supply (UPS) can provide stable and continuous electrical power. Many important items of computer equipment, such as servers, use online UPSs to ensure a secure power supply. An online UPS is directly connected with an external electrical source. However, if one or more online UPSs are inoperative because of malfunction, the electrically powered devices connected to the online UPSs may be shut down due to insufficient power supply. In that event, an operator must manually run standby UPSs to replace the inoperative UPSs. If there are many items of computer equipment powered by a set of UPSs, it is difficult for the operator to manually monitor the set of UPSs and run standby UPSs in time.

In addition, electrical power stored in a UPS is limited, and can only support a computer's operation for a short time. If a power supply from an external power source is lost, files and programs being processed in the computer need to be saved and shut down in short time.

China Pat. Appl. No. CN1360382A discloses an apparatus and method for securely shutting down computer equipment and UPSs when an abnormal event occurs. However, the apparatus cannot automatically invoke standby UPSs when primary UPSs are inoperative, in order to save in-process files before shutdown.

Accordingly, what is needed is a system and method which can overcome the abovementioned problems.

SUMMARY OF THE INVENTION

A primary object of the present invention is to provide a system which periodically collects information on UPSs and electrically powered devices and automatically invokes standby UPSs for continuous power supply when a shutdown event occurs.

Another object of the present invention is to provide a method which periodically collects information on UPSs and electrically powered devices and automatically invokes standby UPSs for continuous power supply when a shutdown event occurs.

To achieve the above-mentioned primary object, in one aspect of the present invention, a preferred embodiment of a system for automatically providing continuous power supply via standby UPSs comprises: a plurality of primary UPSs for providing power supply to electrically powered devices connecting with the primary UPSs; a plurality of standby UPSs connected to the electrically powered devices for providing power supply when there are malfunctions on the primary UPSs; a switch device connected to the standby UPSs for switching over operational states of the standby UPSs; and a monitoring device connected to the primary UPSs, the standby UPSs, the electrically powered devices and the switch device, for collecting information from and giving instructions to the primary UPSs, the standby UPSs and the electrically powered devices. The monitoring device comprises a programmable monitoring module for collecting information, a shutdown controlling module for giving shutdown instructions, and a switch controlling module for controlling the switch device.

To achieve the other above-mentioned object, in another aspect of the present invention, a method for automatically providing continuous power supply is provided. A preferred embodiment of the method is implemented in a power supply system including a plurality of primary UPSs and a plurality of standby UPSs. The method comprises the steps of: monitoring the primary UPSs and electrically powered devices connected to the primary UPSs; determining whether there are any malfunctions on the primary UPSs; determining whether a number of unworkable primary UPSs exceeds a number of the standby UPSs; starting as many of the standby UPSs as are needed for a continuous power supply when the number of unworkable primary UPSs does not exceeds the number of standby UPSs; starting all standby UPSs and sending out a shutdown instruction when the number of unworkable primary UPSs exceeds the number of standby UPSs; and shutting down the electronically powered devices.

Other objects, advantages and novel features of the present invention will be drawn from the following detailed description of preferred embodiments of the present invention with attached drawings, in which:

DETAILED DESCRIPTION OF THE INVENTION

Figure 1:
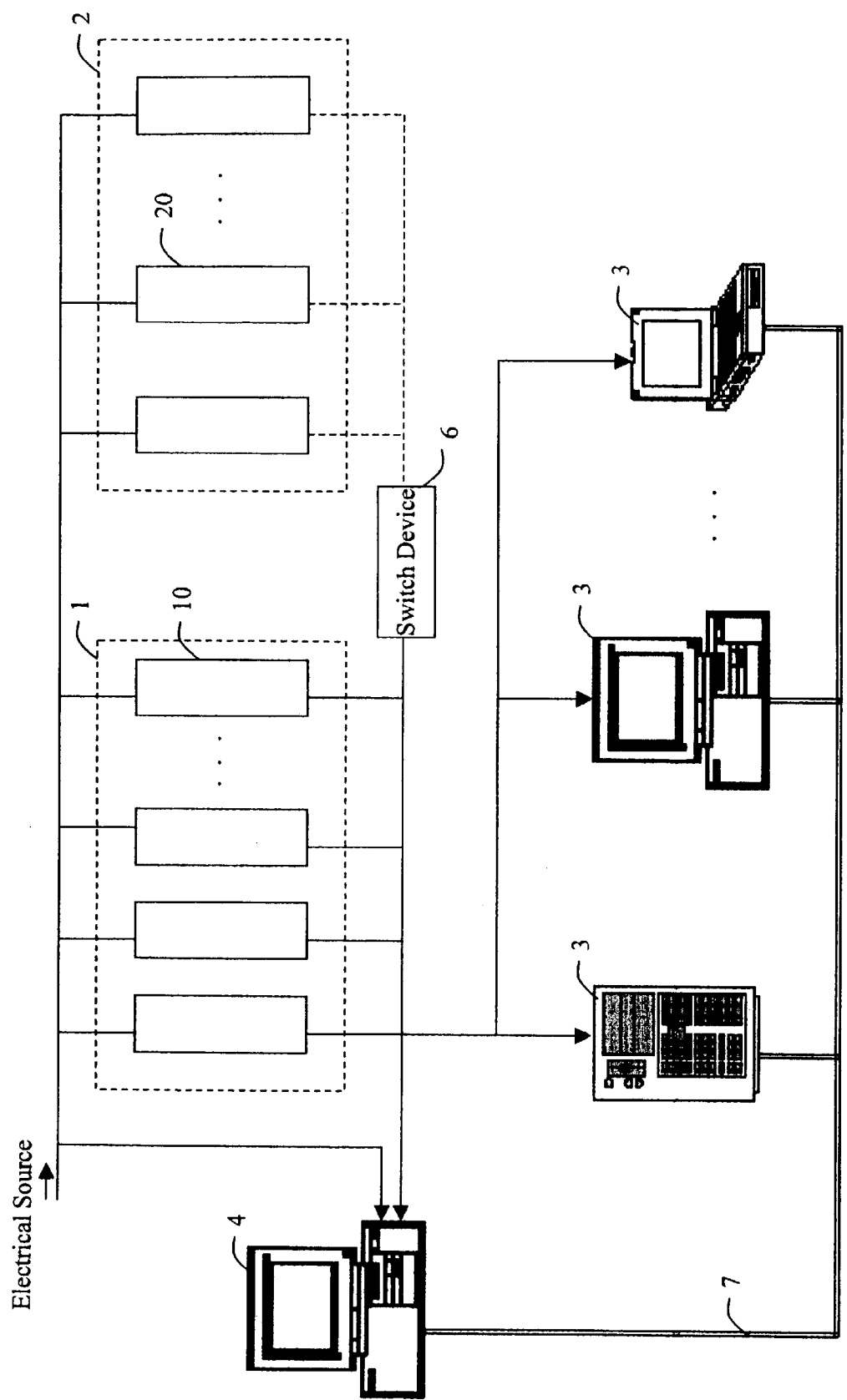
FIG. 1 is a schematic diagram of basic hardware infrastructure of a preferred embodiment of a system of the present invention for automatically providing continuous power supply via standby UPSs.

FIG. 1 is a schematic diagram of basic hardware infrastructure of a preferred embodiment of a system of the present invention for automatically providing continuous power supply via standby UPSs. The system comprises a primary Uninterrupted Power Supply (UPS) set 1, a standby UPS set 2, a monitoring device 4, a switch device 6, and a plurality of electrically powered devices 3. The primary UPS set 1 comprises a plurality of primary UPSs 10 for providing electrical power to the electrically powered devices 3. The primary UPS set 1 is connected to an external electrical source for a continuous power supply. Electrical power from the external electrical source is regulated by the primary UPSs 10 before being provided to run the electrically powered devices 3. In the preferred embodiment of the present invention, all the primary UPSs 10 are online UPSs that directly connect with the external electrical source.

The standby UPS set 2 comprises a plurality of standby UPSs 20 for providing power to the electrically powered devices 3 when there are malfunctions on the primary UPSs 10. The standby UPSs 20 are switched from a "standby" state to a "working" state when one or more primary UPSs 10 are unusable because of malfunction. These "standby" and "working" states are hereinafter referred to as the operational states of the standby UPSs 20.

The switch device 6 is for switching the standby UPSs 20 between the standby and working states.

The monitoring device 4 can be a personal computer that has monitoring software installed therein for monitoring malfunctions occurring on the system. The monitoring device 4 can interchange data with the primary UPS set 1 and the standby UPS set 2 via Serial Bus or network connections. The monitoring device 4 receives data from or sends data to the electrically powered devices 3 via an intranet 7.

The electrically powered devices 3 can be personal computers, servers, notebooks, workstations and other devices that require a stable and continuous power supply.

Figure 2:
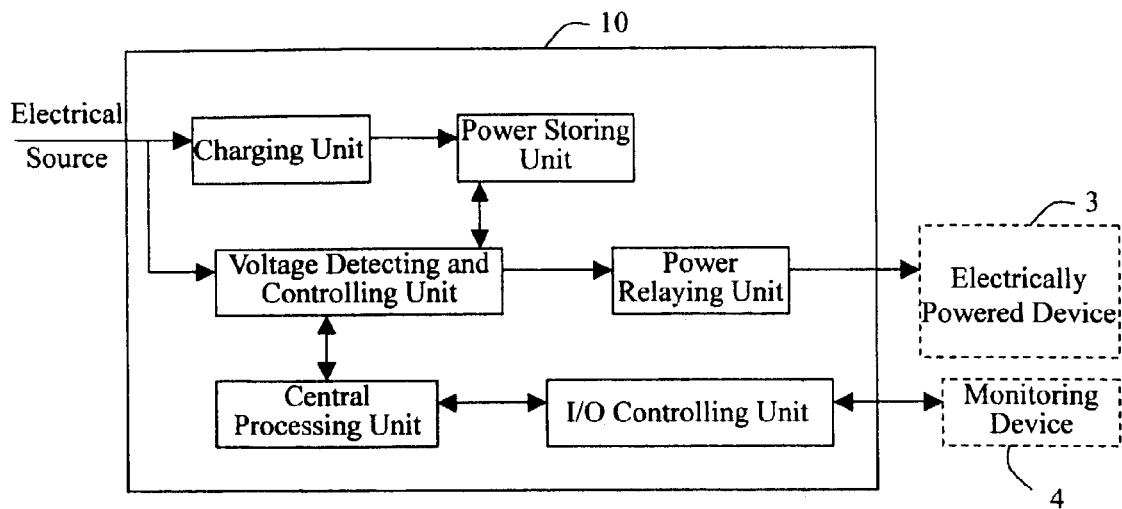
FIG. 2 is a block diagram of infrastructure of a primary UPS of the system of FIG. 1.

FIG. 2 is a block diagram of infrastructure of any one primary UPS 10. The primary UPS 10 comprises a charging unit, a power storing unit, a voltage detecting and controlling unit, a power relaying unit, a central processing unit, and an Input/Output (I/O) controlling unit. The charging unit is connected to the external electrical source for charging up the primary UPS 10. The power storing unit is for storing electrical power in the primary UPS 10. The voltage detecting and controlling unit connects to the external electrical source for detecting voltage provided by the external electrical source. A message regarding voltage detected by the voltage detecting and controlling unit is sent to the central processing unit, which then sends instructions to the voltage detecting and controlling unit and the power relaying unit according to the voltage detected. If the voltage is too low to run the electrically powered devices 3, the central processing unit instructs the voltage detecting and controlling unit to obtain electrical power stored in the power storing unit, and instructs the power relaying unit to relay power to the electrically powered devices 3. The I/O controlling unit is for data interchange with the monitoring device 4.

Figure 3:
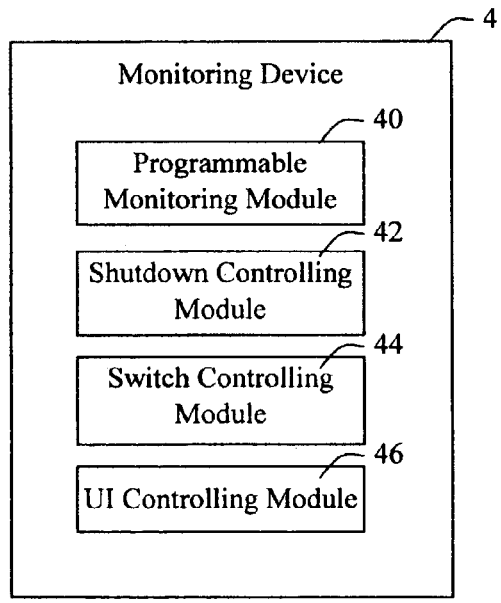
FIG. 3 is a schematic diagram showing main function modules of a monitoring device of the system of FIG. 1.

FIG. 3 is a schematic diagram showing main function modules of the monitoring device 4. The monitoring device 4 comprises a programmable monitoring module 40, a shutdown controlling module 42, a switch controlling module 44, and a user interface (UI) controlling module 46. The programmable monitoring module 40 is for monitoring a power supply of the external electrical source, and monitoring operational states of the primary UPSs 10. The operational states are "standby" and "working," just as for the standby UPSs 20. The programmable monitoring module 40 obtains power supply data from the central processing units via the I/O controlling units of the primary UPSs 10. Normally, the programmable monitoring module 40 sends a query message to each primary UPS 10 at preset regular time intervals, and then determines whether all the primary UPSs 10 are in a normal state according to feedback messages sent by the primary UPSs 10 in response to the respective query messages.

The shutdown controlling module 42 is for sending shutdown instructions to the primary UPSs 10, the standby UPSs 20 and the electrically powered devices 3. When an abnormal event occurs, the shutdown controlling module 42 sends out a shutdown instruction having a preset time delay. An abnormal event may be loss of the external power supply, or malfunction of the primary UPSs 10. The preset time delay is input by system administrators, and provides the electrically powered devices 3 time to save in-process programs before the shutdown instruction is implemented.

The switch controlling module 44 is for controlling the switch device 6 to switch operational states of the standby UPSs 20. When the programmable monitoring module 40 detects that one or more primary UPSs 10 are unusable due to malfunction, the switch controlling module 44 automatically instructs the switch device 6 to invoke the standby UPSs 20 for a continuous power supply. The number of standby UPSs 20 invoked is equal to the number of primary UPSs 10 that are unusable. In addition, system administrators can manually invoke the standby UPSs 20 via the switch controlling module 44.

The UI controlling module 46 is provided for system administrators to search for current statuses of the power supply, the UPSs 10, 20 and the electrically powered devices 3, and to set relevant parameters and give instructions.

Figure 4:
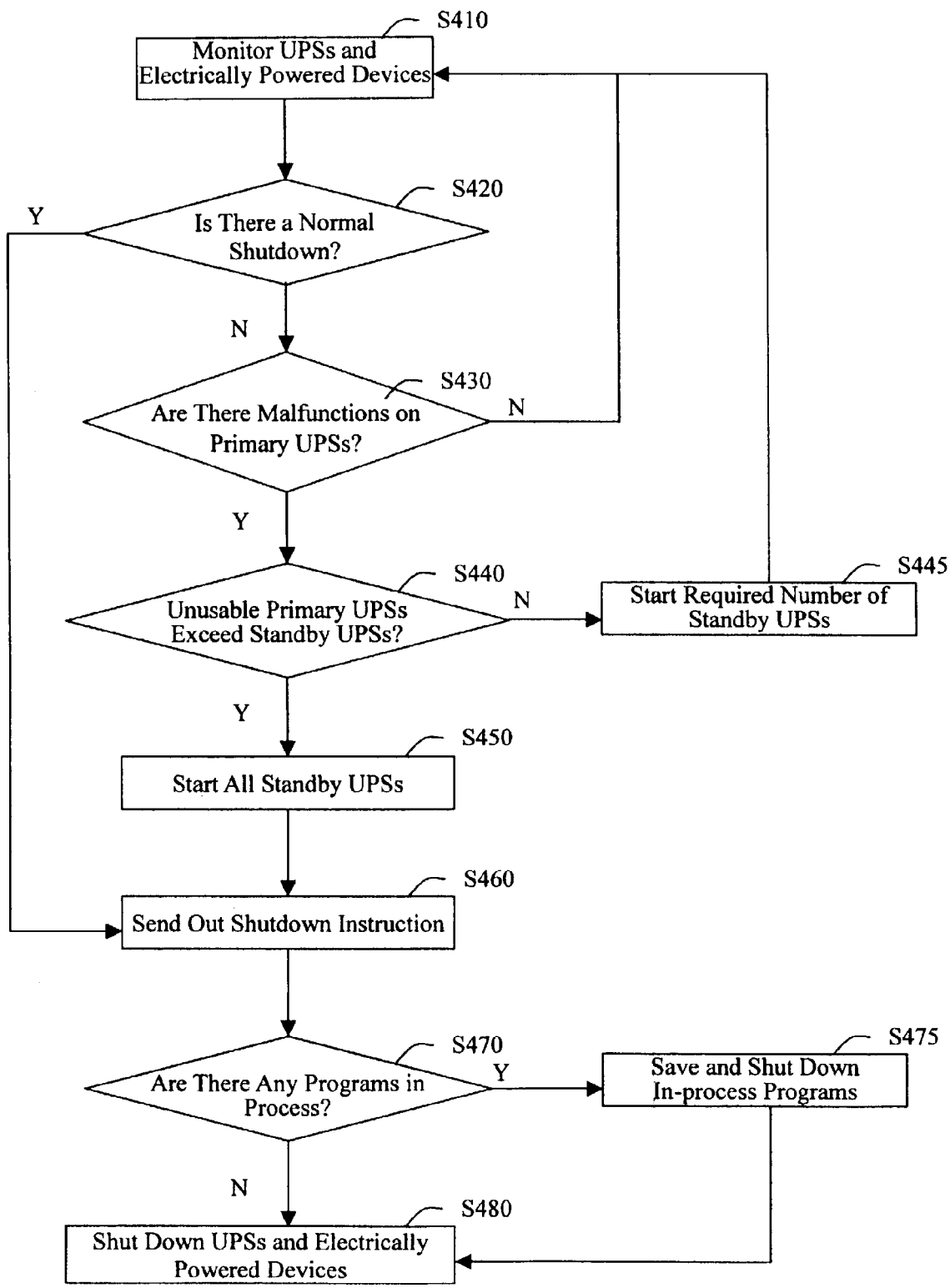
FIG. 4 is a flowchart of a preferred method of the present invention for automatically providing continuous power supply via standby UPSs, the method being implemented in the system of FIG. 1.

FIG. 4 is a flowchart of a preferred method of the present invention for automatically providing continuous power supply via standby UPSs, the method being implemented in the above-described preferred embodiment of the system of the present invention. In step S410, the monitoring device 4 automatically monitors operational states of the main hardware units, including the primary UPS set 1, the standby UPS set 2 and the electrically powered devices 3. The monitoring device 4 periodically sends a query message to each said hardware unit, and obtains information on an operational state thereof according to a feedback message sent by the hardware unit. In step S420, the monitoring device 4 determines whether there is a normal shutdown instruction. The normal shutdown instruction is generally given by a system administrator for shutting down one or more primary UPSs 10 or electrically powered devices 3. If there is a normal shutdown instruction, the procedure proceeds directly to step S460 described below. If there is no normal shutdown instruction, in step S430, the monitoring device 4 determines whether there are malfunctions on the primary UPSs 10. The monitoring device 4 periodically sends a query message to each primary UPS 10, and obtains operational states of the primary UPSs 10 according to feedback messages sent by the primary UPSs 10. If all the primary UPSs 10 are in a normal state, the procedure returns to step S410. If one or more primary UPSs 10 are unusable because of malfunction, in step S440, the monitoring device 4 counts the number of unusable primary UPSs 10 and determines whether the number of unusable primary UPSs 10 exceeds a total number of standby UPSs 20. If the number of unusable primary UPSs 10 does not exceed the total number of standby UPSs 20, in step S445, the monitoring device 4 automatically starts as many of the standby UPSs 20 as are needed for a continuous power supply, and the procedure returns to step S410.

If the number of unusable primary UPSs 10 exceeds the total number of standby UPSs 20, in step S450, the monitoring device 4 automatically starts all standby UPSs 20. In step S460, the monitoring device 4 sends out a shutdown instruction having a preset time delay to the electrically powered devices 3, the primary UPSs 10 and the standby UPSs 20. Before the shutdown instruction is implemented, in step S470, the electrically powered devices 3 check whether there are programs being processed therein. If there are no programs being processed in the electrically powered devices 3, in step S480, the primary and standby UPSs 10, 20 and the electrically powered devices 3 are shut down. If there are programs being processed in the electrically powered devices 3, in step S475, the in-process programs are saved and shut down, whereupon the procedure proceeds to step S480.

The preferred embodiment described herein is merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims which follow and their equivalents.

What is claimed is:

1. A system for providing continuous power supply, the system comprising:
   a plurality of primary uninterrupted power supplies (UPSs) for providing power supply to electrically powered devices connecting with the primary UPSs;
   at least one standby UPS connected to the electrically powered devices for providing power supply in the case of malfunction on any of the primary UPSs;
   a switch device connected to the at least one standby UPS for switching over operational states of the at least one standby UPS; and
   a monitoring device connected to the primary UPSs, the at least one standby UPS, the electrically powered devices and the switch device, for collecting information from and giving instructions to the primary UPSs, the at least one standby UPS and the electrically powered devices, the monitoring device comprising a programmable monitoring module for collecting information, a shutdown controlling module for giving shutdown instructions, and a switch controlling module for controlling the switch device;
   wherein, the shutdown controlling module is for sending out a shutdown instruction to shutdown the system when the programmable monitoring module detects that the number of malfunctioned primary UPSs exceeds the number of standby UPSs.

2. The system as claimed in claim 1 wherein the monitoring device further comprises a user interface controlling module for users to access the monitoring device.

3. The system as claimed in claim 1, wherein the primary UPSs and the at least one standby UPS are online UPSs that directly connect wit an external electrical source.

4. The system as claimed in claim 1, wherein the electrically powered devices comprise any one or more of the following items: personal computers, servers, notebooks, workstations and other devices that require a stable and continuous power supply.

5. A method for providing continuous power supply, the method being implemented in a power supply system including a plurality of primary uninterrupted power supplies (UPSs) and at least one standby UPS, the method comprising the steps of:
   monitoring the primary UPSs and electrically powered devices connected to the primary UPSs;
   determining whether there is any malfunction on the primary UPSs;
   determining whether a number of unworkable primary UPSs exceeds a number of standby UPSs;
   starting as many of the at least one standby UPS as are needed for a continuous power supply when the number of unworkable primary UPSs does not exceed the number of the at least one standby UPS;
   starting all standby UPSs and sending out a shutdown instruction to shutdown the system when the number of unworkable primary UPSs exceeds the number of standby UPSs; and
   shutting down the electrically powered devices.

6. The method as claimed in claim 5, wherein the step of monitoring the primary UPSs and the electrically powered devices comprises the steps of:
   periodically sending a query message to the primary UPSs and the electrically powered devices; and
   receiving feedback messages from the primary UPSs and the electrically powered devices.

7. The method as claimed in claim 5, wherein the primary UPSs and the at least one standby UPS are online UPSs that directly connect with an external electrical source.

8. A method of automatically providing continuous power supply via a plurality of standby uninterrupted power supplies (UPSs) for an electrical device during a shutdown, comprising steps of:
   (1) providing a plurality of primary UPSs and the standby UPSs;
   (2) monitoring connection between the primary UPSs and the electrical device;
   (3) determining whether said shutdown is normal or not;
   (4) running a shutdown program if said shutdown is normal, or
   (5) checking whether any malfunction of the primary UPSs exists, if said shutdown is not normal; and
   (6) starting a required number of the standby UPSs if said malfunction exists and an amount of the malfunctioned primary UPSs does not exceed that of the standby UPSs, wherein said required number is the same as the amount of the malfunctioned primary UPSs; or starting all the standby UPSs if said malfunction exists and the amount of the malfunctioned primary UPSs is greater than that of the standby UPSs, and running a shutdown program.

* * * * *